(12) United States Patent
You et al.

(10) Patent No.: US 12,441,215 B2
(45) Date of Patent: Oct. 14, 2025

(54) SEAT FOR VEHICLE (71) Applicants: Hyundai Motor Company, Seoul (KR); Kia Corporation, Seoul (KR); Hyundai Transys Inc., Seosan-si (KR)

(72) Inventors: Jung Sang You, Hwaseong-Si (KR); Yong Chul Kim, Hwaseong-Si (KR); Dae Hee Lee, Incheon (KR); Eun Sue Kim, Hwaseong-Si (KR); Jae Hoon Cho, Hwaseong-Si (KR); Han Kyung Park, Hwaseong-Si (KR); Jae Sung Shin, Hwaseong-Si (KR); Hae Dong Kwak, Hwaseong-Si (KR); Jun Sik Hwang, Hwaseong-Si (KR); Gwon Hwa Bok, Hwaseong-Si (KR)

(73) Assignees: Hyundai Motor Company, Seoul (KR); Kia Corporation, Seoul (KR); Hyundai Transys Inc., Seosan-si (KR)

( * ) Notice: Subject to any disclaimer, the term of this patent is extended or adjusted under 35 U.S.C. 154(b) by 408 days.

(21) Appl. No.: 18/099,398

(22) Filed: Jan. 20, 2023

(65) Prior Publication Data

US 2024/0092228 A1 Mar. 21, 2024

(30) Foreign Application Priority Data

Sep. 16, 2022 (KR) .................. 10-2022-0117206

(51) Int. Cl.
*B60N 2/06* (2006.01)
*B60N 2/01* (2006.01)
*B60N 2/08* (2006.01)

(52) U.S. Cl.
CPC ............... *B60N 2/062* (2013.01); *B60N 2/01* (2013.01); *B60N 2/08* (2013.01)

(58) Field of Classification Search
CPC .......... B60N 2/005; B60N 2/01; B60N 2/062; B60N 2/08
USPC ................................ 296/65.01, 65.11, 65.13
See application file for complete search history.

(56) References Cited

U.S. PATENT DOCUMENTS 11,820,265 B2 * 11/2023 Rehmet .................... B60N 2/06
2015/0151651 A1 * 6/2015 Stingle .................. B60N 2/062
296/64
2023/0311623 A1 * 10/2023 Koreishi ................ B60N 2/005

FOREIGN PATENT DOCUMENTS

| JP | 6675276 | 4/2020 |
| KR | 20-1997-0031493 U | 7/1997 |
| KR | 10-2003-0088899 | 11/2003 |
| KR | 10-2008-0054526 | 6/2008 |

* cited by examiner

*Primary Examiner* — Jason S Daniels
(74) *Attorney, Agent, or Firm* — Morgan Lewis & Bockius LLP (57) ABSTRACT

A seat for a vehicle, includes a second row center seat and a second row side seat provided on a partition wall positioned rearward of a driver seat, the second row center seat may move leftward or rightward, and an interval between the seats may be increased in a state in which the second row center seat is moved in a right direction away from the second row side seat, which makes it possible to maximally prevent body contact between a passenger in the second row center seat and a passenger in the second row side seat.

12 Claims, 10 Drawing Sheets

SEAT FOR VEHICLE

CROSS REFERENCE TO RELATED APPLICATION

The present application claims priority to Korean Patent Application No. 10-2022-0117206, filed on Sep. 16, 2022, the entire contents of which is incorporated herein for all purposes by this reference.

BACKGROUND OF THE PRESENT DISCLOSURE

Field of the Present Disclosure

The present disclosure relates to a seat for a vehicle, and more particularly, to a technology related to a seat for a vehicle that has a partition wall configured to separate a driver seat and a driver seat rear space.

Description of Related Art

There is a multi-purpose vehicle having an internal space in which passengers and baggage are loaded.

In the multi-purpose vehicle, no passenger seat (front passenger seat) is provided next to a driver seat, and a carrier for loading and storing baggage may be provided, instead of the passenger seat, in a space in which the passenger seat was provided.

Furthermore, to load a maximum number of passengers in a limited internal space in the multi-purpose vehicle, a second row seat may be provided on a partition wall for separating a driver seat and a driver seat rear space may be provided, and a third row seat may be provided to be positioned rearward of the second row seat.

The second row seat provided on the partition wall positioned rearward of the driver seat is typically provided as two seats disposed in a leftward/rightward direction thereof.

In the multi-purpose vehicle in the related art in which the two second row seats are disposed in the leftward/rightward direction and provided on the partition wall positioned rearward of the driver seat as described above, the second row seat is provided as a fixed structure that cannot move leftward and rightward, which causes a problem in that an interval between left and right passengers is small, and shoulders of the passengers collide with one another, which makes it difficult for the passengers to be accommodated in the seats in a comfortable state.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a seat for a vehicle, which is provided on a partition wall positioned rearward of a driver seat and may change a position thereof by moving leftward or rightward, as necessary so that a leftward/rightward interval between the seats may be increased, contact between left and right passenger's bodies may be maximally prevented, and the passenger's comfortable accommodated state may be implemented.

To achieve the above-mentioned object, various aspects of the present disclosure are directed to providing a seat for a vehicle, the seat including: a second row center seat and a second row side seat provided on a partition wall positioned rearward of a driver seat in the vehicle; and a locking device configured to selectively connect the partition wall and the second row center seat, in which when the locking device is unlocked, the second row center seat is movable leftward or rightward of the vehicle so that an interval between the second row center seat and the second row side seat is adjusted.

The locking device may include: a lever bracket provided on a back portion of the second row center seat; a locking lever coupled to the lever bracket and configured to be rotatable forward or rearward about a lever pin connecting the locking lever and the lever bracket; and a locking plate fixedly provided on the partition wall to face the locking lever and including a locking groove into which a lower end portion of the locking lever is inserted.

The locking device may further include a lever spring coupled to the lever bracket and first and second opposite end portions of the locking lever and configured to provide a restoring force to the locking lever.

The locking groove may include a left locking groove and a right locking groove, the locking plate may have a guide groove extending leftward and rightward, and the left locking groove and the right locking groove may be connected to two opposite end portions of the guide groove and protrude in the same direction.

When the lower end portion of the locking lever is inserted into the left locking groove or the right locking groove, the second row center seat may become in a fixed state in which the second row center seat cannot move leftward and rightward.

When the lower end portion of the locking lever is separated from the left locking groove or the right locking groove and positioned in the guide groove, the locking lever may be configured for moving along the guide groove, and the second row center seat may be configured for moving leftward or rightward.

When the lower end portion of the locking lever is inserted into the left locking groove, the second row center seat may move to the second row side seat and become in a fixed state so that an interval between the second row center seat and the second row side seat is maintained to be a first interval.

When the lower end portion of the locking lever is inserted into the right locking groove, the second row center seat may move laterally away from the second row side seat and become in a fixed state so that an interval between the second row center seat and the second row side seat is maintained to be a second interval.

The seat may further include: a lever cable connected to the locking lever; and a release lever connected to the lever cable, provided on the back portion of the second row center seat, and configured to be manipulated by a user.

When the lever cable is pulled in response that the user manipulates the release lever in a state in which the lower end portion of the locking lever is inserted into the left locking groove or the right locking groove, the lower end portion of the locking lever may be separated from the left locking groove or the right locking groove and positioned in the guide groove by a rotation of the locking lever, in which when the lower end portion of the locking lever is positioned in the guide groove, the locking lever may be unlocked, and in which when the locking lever is unlocked, the second row center seat may be configured for moving leftward or rightward.

A partition wall mounting bracket may be fixed to the partition wall, a guide rod may be fixed to the partition wall mounting bracket and extend leftward and rightward, a slide bracket may be fixed to a back portion of the second row center seat, the guide rod may penetrate the slide bracket, and the second row center seat may move leftward or rightward when the slide bracket moves along the guide rod.

The second row center seat may include: a back portion connected to the partition wall; and a cushion portion rotatably coupled to the back portion, and the second row center seat may move leftward or rightward in a state in which the cushion portion is tipped up to be in contact with the back portion.

The seat for a vehicle according to an exemplary embodiment of the present disclosure includes the second row center seat and the second row side seat provided on the partition wall positioned rearward of the driver seat, and the second row center seat is structured to move leftward or rightward relative to the partition wall. When the second row center seat moves in the right direction away from the second row side seat, the interval between the second row center seat and the second row side seat is increased and maintained. Therefore, it is possible to maximally prevent contact between the passenger accommodated in the second row center seat and the passenger accommodated in the second row side seat, inducing a comfortable accommodated state of the passenger.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably to facilitate the description, but the suffixes themselves do not have distinguishable meanings or functions.

In the detailed description included in the present specification, the specific descriptions of publicly known related technologies will be omitted when it is determined that the specific descriptions may obscure the subject matter of the exemplary embodiments included in the present specification.

Furthermore, it may be understood that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "directly coupled to" or "directly connected to" another constituent element, it may be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term "control unit" or "unit" including "motor control unit (MCU)" or "hybrid control unit (HCU)" is merely a term widely used to name a control device (controller or control unit) for controlling a particular vehicle function but does not mean a generic function unit.

The control unit (controller) may include a communication device configured to communicate with another control unit or a sensor to control a corresponding function, a memory configured to store an operating system, a logic command, and input/output information, and one or more processors configured to perform determination, computation, decision, or the like required to control the corresponding function.

Hereinafter, a seat for a vehicle according to various exemplary embodiments of the present disclosure will be described with reference to the accompanying drawings.

As illustrated in FIGS. 1 to 10, in the exemplary embodiment the exemplary embodiment of the present disclosure, a second row seat 3 according to an exemplary embodiment of the present disclosure is provided by use of a partition wall 2 provided to separate a driver seat 1 of a vehicle and a rear space of the driver seat 1. A third row seat 4 is provided rearward of the second row seat 3 and spaced from the second row seat 3.

Figure 1:
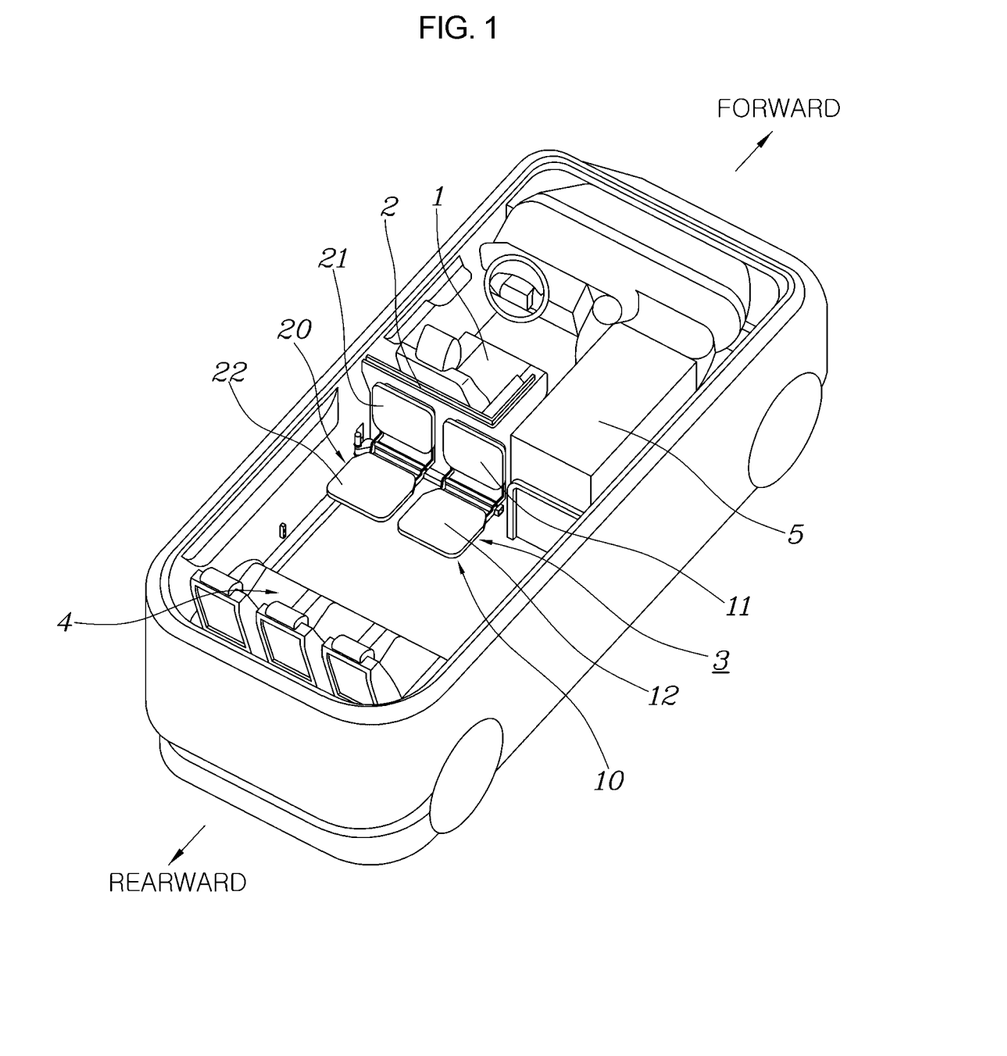
FIG. 1 is a view of a multi-purpose vehicle including a second row seat provided on a partition wall according to an exemplary embodiment of the present disclosure.

Furthermore, a carrier 5 is provided on a lateral portion of the driver seat 1 instead of a passenger seat (front passenger seat) and may load and store baggage by use of a space in which the passenger seat is provided. The carrier 5 is provided to slide in a forward/rearward direction thereof.

The vehicle, in which the carrier 5 is provided in the passenger seat space, the second row seat 3 is provided by use of the partition wall 2 positioned rearward of the driver seat 1, and the third row seat 4 is provided rearward of the second row seat 3, may be referred to as a typically multi-purpose vehicle.

The second row seat 3 according to an exemplary embodiment of the present disclosure includes a second row center seat 10 and a second row side seat 20.

The second row center seat 10 according to an exemplary embodiment of the present disclosure is provided and structured to move leftward or rightward relative to the partition wall 2, and the second row side seat 20 is fixed on the partition wall 2.

Therefore, when the second row center seat 10 moves rightward and thus moves laterally away from the second row side seat 20, an interval between the second row center seat 10 and the second row side seat 20 is increased and maintained. Therefore, it is possible to maximally prevent contact between the passenger accommodated in the second row center seat 10 and the passenger accommodated in the second row side seat 20, inducing a comfortable accommodated state of the passenger.

The second row center seat 10 and the second row side seat 20 include back portions 11 and 21 and cushion portions 12 and 22. The cushion portions 12 and 22 are configured to perform tip-up operations (or up-folding operations) so that the cushion portions 12 and 22 are unfolded or folded upward by being rotated relative to the back portions 11 and 21.

When the passenger is accommodated in the second row seat 3, the back portion 11 or 21 is a portion for supporting the passenger's upper body, and the cushion portion 12 or 22 is a portion for supporting the passenger's lower body.

In the exemplary embodiment of the present disclosure, the partition wall 2 and the back portion 11 of the second row center seat 10 are connected by a locking device 100. When the locking device 100 is unlocked, the second row center seat 10 may move leftward or rightward relative to the partition wall 2. The interval between the second row center seat 10 and the second row side seat 20 may be adjusted by the leftward and rightward movements of the second row center seat 10.

The locking device 100 includes: a lever bracket 110 fixedly provided on the back portion 11 of the second row center seat 10; a locking lever 130 coupled to the lever bracket 110 and configured to be rotatable forward or rearward about a lever pin 120; and a locking plate 150 fixedly provided on the partition wall 2 to face the locking lever 130 and including a locking groove 140 into which a lower end portion of the locking lever 130 is inserted.

The lever bracket 110 is coupled to the back portion 11 of the second row center seat 10 and exposed forward toward the partition wall 2. An upper end portion of the locking lever 130 is coupled to the lever bracket 110 and configured to be rotatable forward or rearward about the lever pin 120.

The locking plate 150 is positioned below the locking lever 130 and fixedly provided on the partition wall 2 to extend leftward and rightward. A lower end portion of the locking lever 130 is provided to penetrate the locking plate 150.

The locking device 100 according to an exemplary embodiment of the present disclosure further includes lever springs 160 coupled to the lever bracket 110 and two opposite end portions of the locking lever 130 and configured to provide a restoring force to the locking lever 130.

When the user holds and pulls a release lever 300 to be described below, a lever cable 200 is pulled. As the lever cable 200 is pulled, the locking lever 130 rotates rearward about the lever pin 120. When the locking lever 130 rotates, the lever spring 160 accumulates an elastic force while being extended. When the user releases the held release lever 300, a shape of the extending lever spring 160 is restored. In the instant case, the accumulated elastic force is applied as a restoring force to the locking lever 130 so that the locking lever 130 is returned to an initial position.

The locking groove 140 formed in the locking plate 150 includes a left locking groove 141 and a right locking groove 142. The left locking groove 141 and the right locking groove 142 are spaced from each other in the leftward/rightward direction thereof.

Furthermore, the locking plate 150 has a guide groove 170 extending leftward and rightward, and the left locking groove 141 and the right locking groove 142 are connected to two opposite end portions of the guide groove 170 so that the left locking groove 141 and the right locking groove 142 protrude in the same direction.

That is, the guide groove 170 is formed on the locking plate 150 and extends leftward and rightward, the left locking groove 141 and the right locking groove 142 are respectively connected to the left and right end portions of the guide groove 170 and protrude forward thereof.

A lower end portion of the locking lever 130 is provided to penetrate the guide groove 170 upward or downward and provided to be movable leftward or rightward along the guide groove 170. The lower end portion of the locking lever 130 may be inserted into the left locking groove 141 at a left end position of the guide groove 170, and the lower end portion of the locking lever 130 may be inserted into the right locking groove 142 at a right end position of the guide groove 170.

When the lower end portion of the locking lever 130 is inserted into the left locking groove 141 or the right locking groove 142, the locking lever 130 is in a locked state in which the locking lever 130 cannot move leftward or rightward. In the instant case, the second row center seat 10 is in a locked state in which second row center seat 10 cannot move leftward or rightward.

Furthermore, when the locking lever 130 rotates and the lower end portion of the locking lever 130 is separated from the left locking groove 141 or the right locking groove 142 and positioned in the guide groove 170, the locking lever 130 is in a state in which the locking lever 130 may move along the guide groove 170. In the instant case, the second row center seat 10 is in an unlocked state in which the second row center seat 10 may move leftward or rightward.

Figure 2:
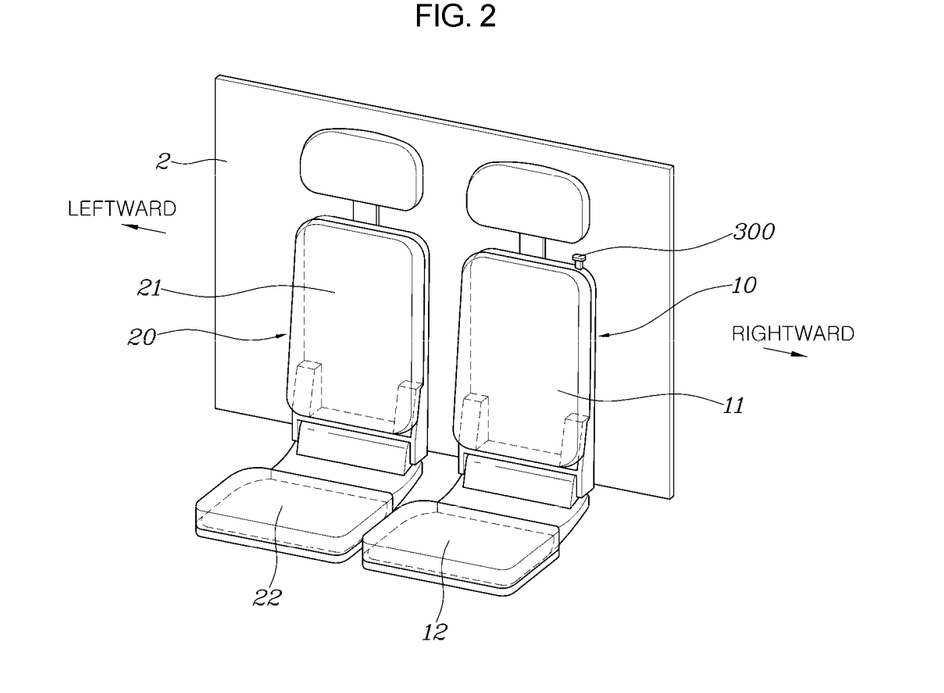
FIG. 2 is a view exemplarily illustrating a state in which a second row center seat is moved to a second row side seat and fixed according to an exemplary embodiment of the present disclosure.
Figure 3:
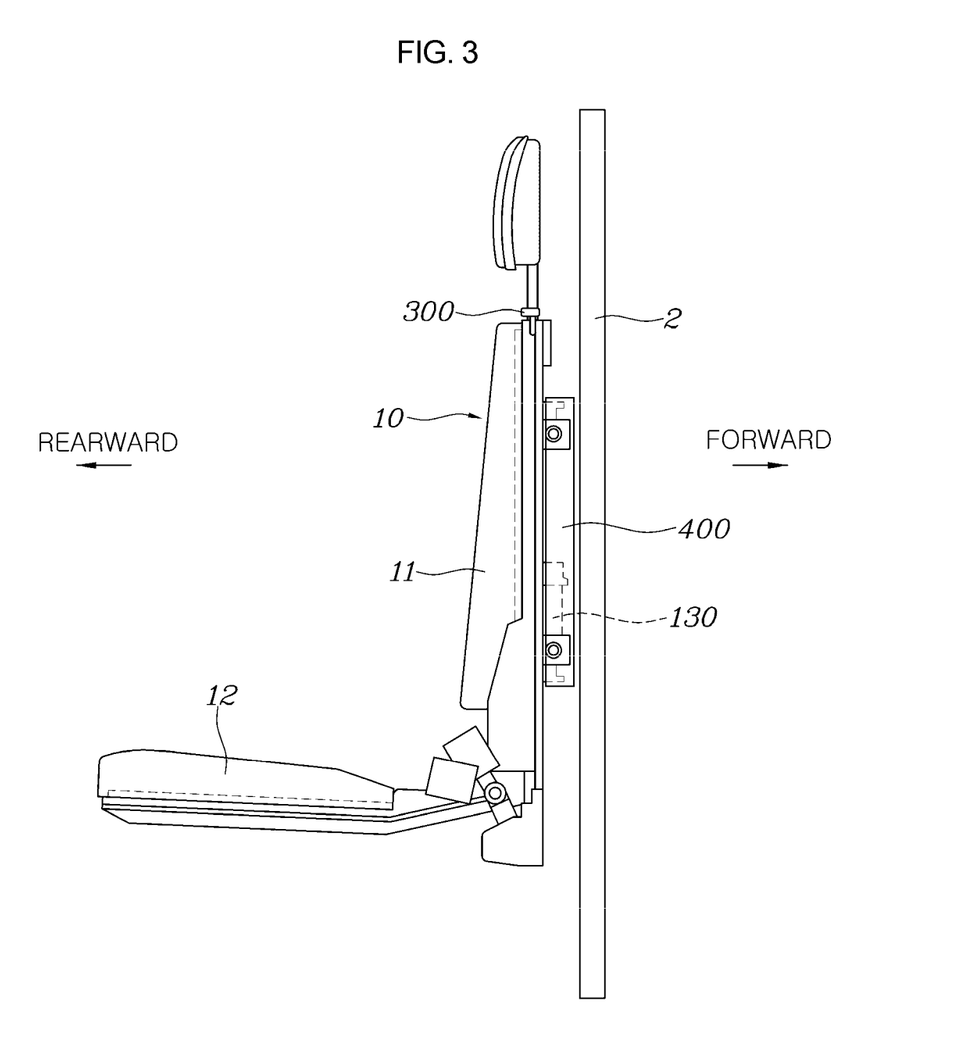
FIG. 3 is a right side view of FIG. 2.
Figure 4:
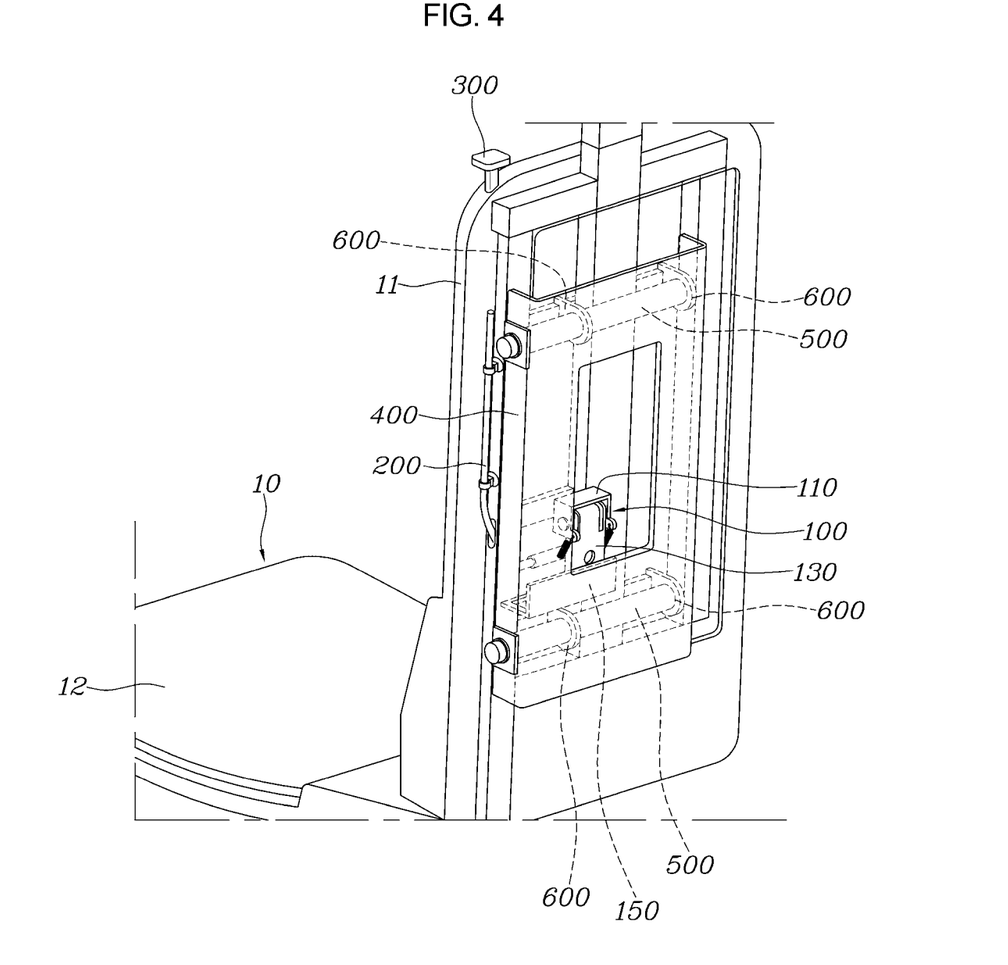
FIG. 4 is a rear view of the second row center seat according to an exemplary embodiment of the present disclosure.
Figure 5:
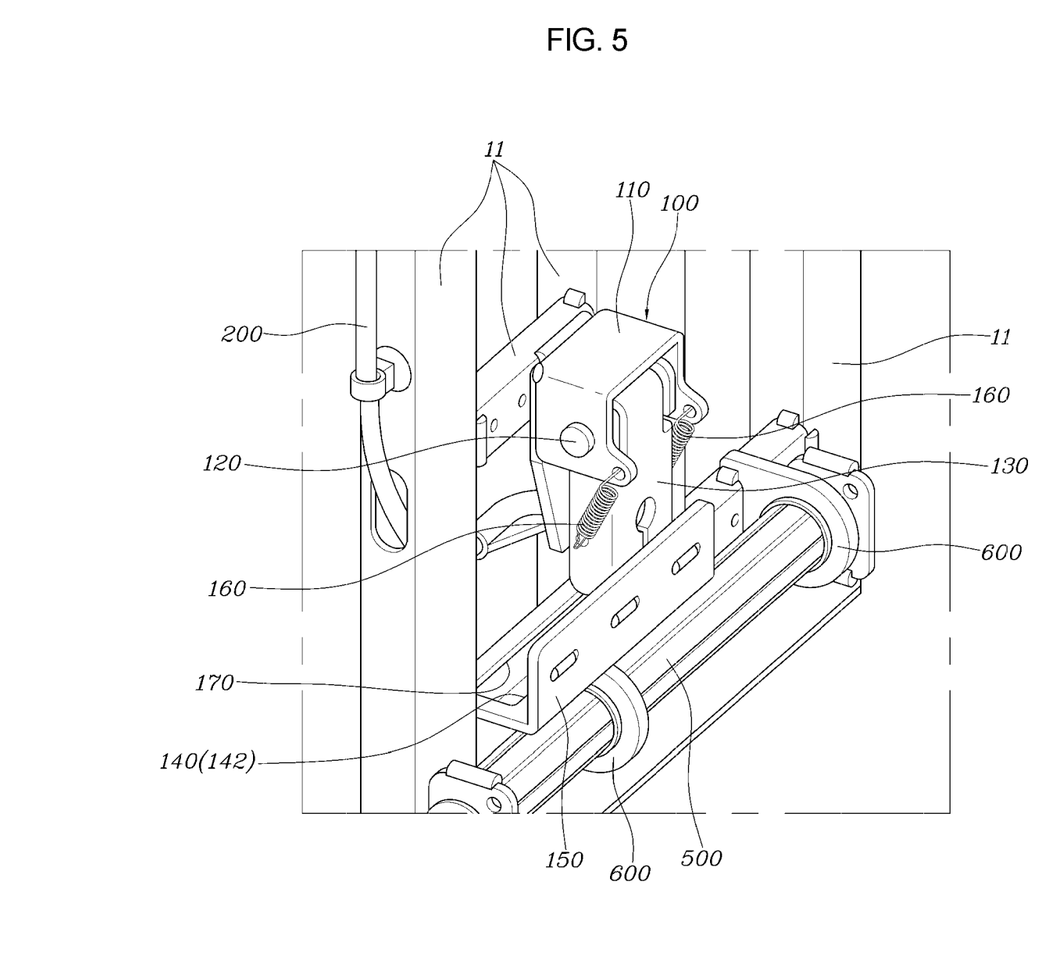
FIG. 5 and FIG. 6 are views exemplarily illustrating a state in which a locking lever is inserted into a left locking groove and moves rightward along a guide groove according to an exemplary embodiment of the present disclosure.

When the lower end portion of the locking lever 130 is inserted and fixed into the left locking groove 141, the second row center seat 10 is moved to the second row side seat 20 and becomes in a fixed state so that the interval between the second row center seat 10 and the second row side seat 20 is maintained to be small (state in FIG. 2).

Figure 7:
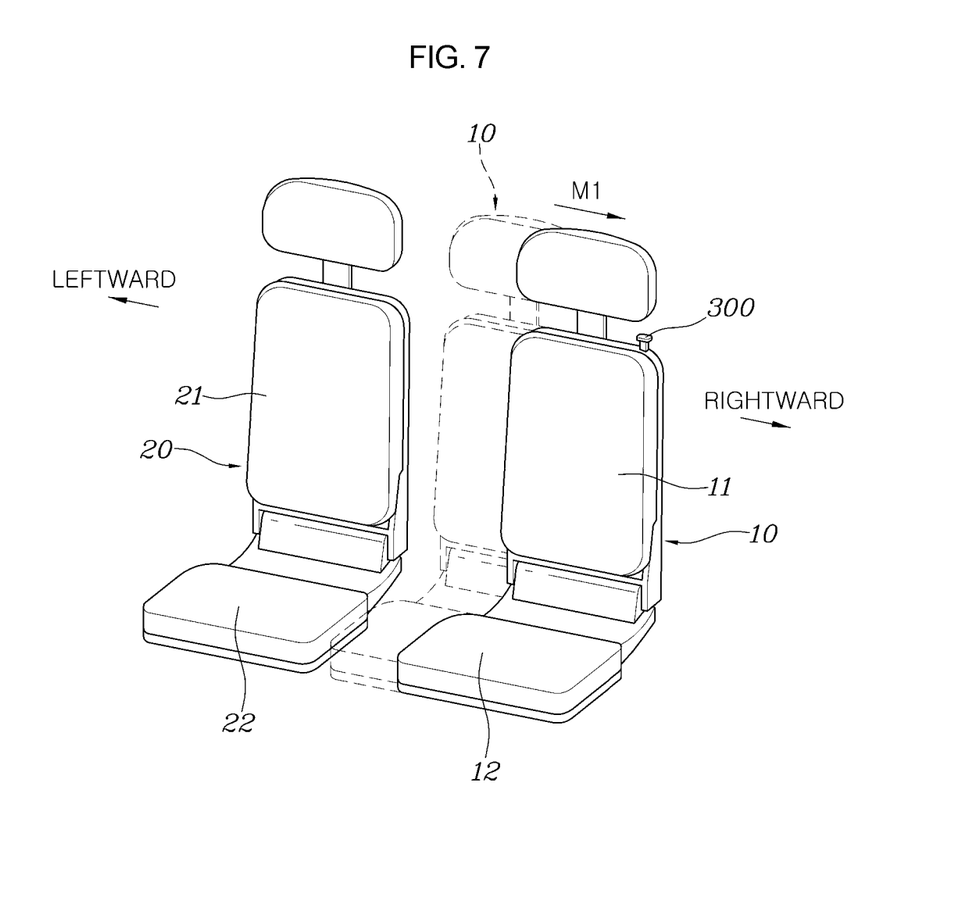
FIG. 7 is a view for explaining an operating state in which the second row center seat moves rightward, and an interval between the second row center seat and the second row side seat is increased according to an exemplary embodiment of the present disclosure.

Furthermore, when the lower end portion of the locking lever 130 is inserted and fixed into the right locking groove 142, the second row center seat 10 is moved laterally (rightward) away from the second row side seat 20 and becomes in a fixed state so that the interval between the second row center seat 10 and the second row side seat 20 is maintained to be large (state in FIG. 7).

In the state in which the lower end portion of the locking lever 130 is positioned in the guide groove 170, the lower end portion of the locking lever 130 may move leftward or rightward along the guide groove 170. In the instant case, the second row center seat 10 may move leftward or rightward.

The locking lever 130 according to an exemplary embodiment of the present disclosure is connected to one end portion of the lever cable 200, and the other end portion of the lever cable 200 is connected to the release lever 300.

The release lever 300 is provided at the upper end portion of the back portion 10 of the second row center seat 10 to operate upward or downward. When the user holds and pulls the release lever 300, the release lever 300 rotates the locking lever 130 through the lever cable 200.

When the lever cable 200 is pulled as the user pulls the release lever 300 upward in the state in which the lower end portion of the locking lever 130 is inserted into the left locking groove 141 or the right locking groove 142, the locking lever 130 rotates rearward about the lever pin 120, and the lower end portion of the locking lever 130 is separated from the left locking groove 141 or the right locking groove 142 and positioned in the guide groove 170 by the rotation of the locking lever 130. When the lower end portion of the locking lever 130 is positioned in the guide groove 170, the locking lever 130 is unlocked. When the locking lever 130 is unlocked, the second row center seat 10 is in the state in which the second row center seat 10 may move leftward or rightward.

A partition wall mounting bracket 400 is fixed to the partition wall 2 according to an exemplary embodiment of the present disclosure, and a guide rod 500 is fixed to the partition wall mounting bracket 400 and extends leftward and rightward. A slide bracket 600 is fixed to the back portion 11 of the second row center seat 10, and the guide rod 500 is provided to penetrate the slide bracket 600. When the slide bracket 600 moves along the guide rod 500, the second row center seat 10 moves leftward or rightward.

The guide rod 500 and the slide bracket 600 are components provided to guide the leftward/rightward movement of the second row center seat 10. Two guide rods 500 are provided to allow the slide bracket 600 to stably moved. The two guide rods 500 are provided on the back portion 11 of the second row center seat 10 and spaced from each other upward or downward, and the two guide rods 500 extend leftward and rightward. At least two or more slide brackets 600 may be coupled to each of the guide rods 600.

FIG. 2, FIG. 3, FIG. 4 and FIG. 5 illustrate that the second row center seat 10 is moved to the second row side seat 20 and becomes in the fixed state. In the instant case, the interval between the second row center seat 10 and the second row side seat 20 is small, and the lower end portion of the locking lever 130 is inserted into the left locking groove 141 (state an in FIG. 6).

Figure 6:
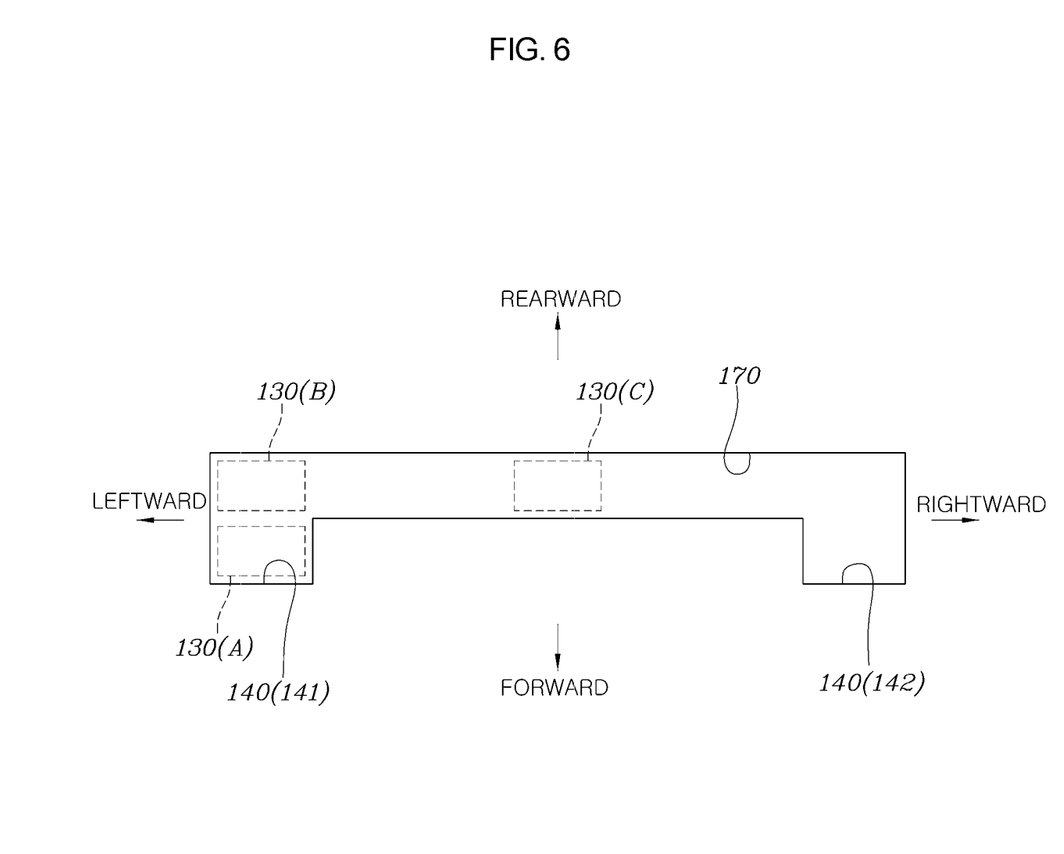

When the lever cable 200 is pulled as the user manipulates the release lever 300 in the above-mentioned state, the locking lever 130 rotates rearward about the lever pin 120, and the lower end portion of the locking lever 130 is separated from the left locking groove 141 and positioned in the guide groove 170 by the rotation of the locking lever 130 (state B in FIG. 6).

When the lower end portion of the locking lever 130 is separated from the left locking groove 141 and positioned in the guide groove 170, the locking lever 130 is unlocked from the present state. When the locking lever 130 is unlocked, the lower end portion of the locking lever 130 may move along the guide groove 170, and thus the second row center seat 10 may move rightward relative to the partition wall 2.

When the user moves the second row center seat 10 rightward in the state in which the lower end portion of the locking lever 130 is separated from the left locking groove 141 and positioned in the guide groove 170, the lower end portion of the locking lever 130 moves rightward along the guide groove 170 so that the second row center seat 10 moves in the right direction which is the direction away from the second row side seat 20 (see arrow M1 in FIG. 7).

Figure 8:
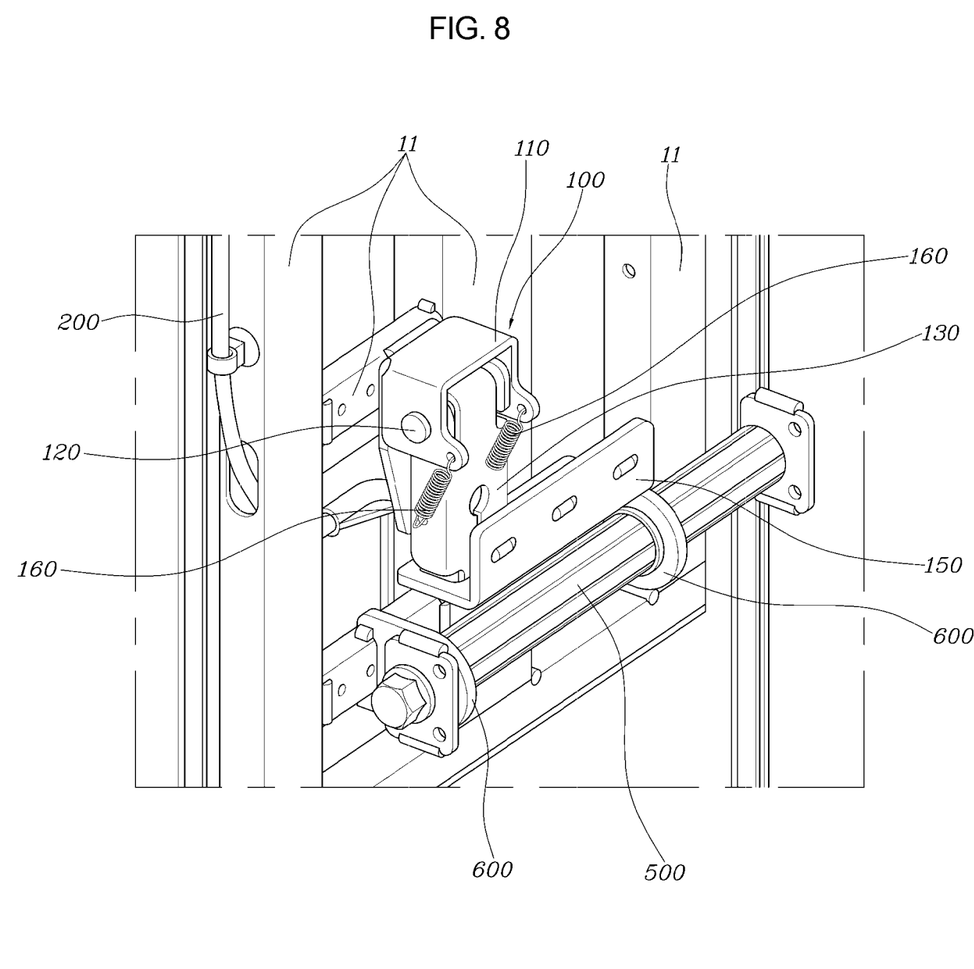
FIG. 8 and FIG. 9 are views exemplarily illustrating a state in which the locking lever is inserted into a right locking groove in FIG. 7.
Figure 9:
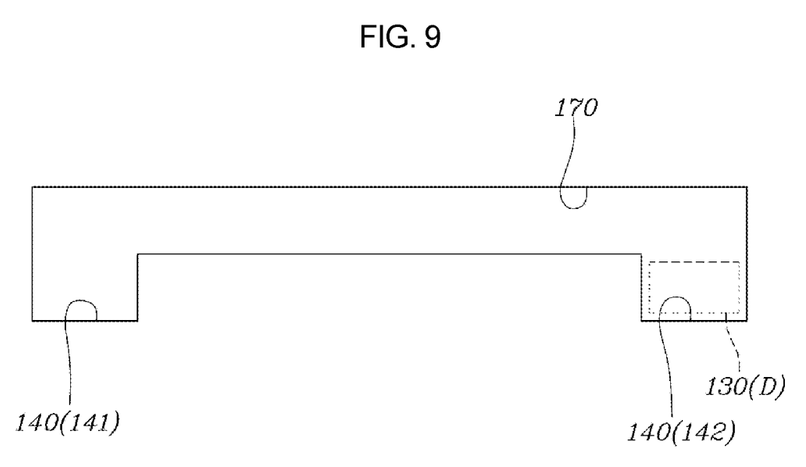

FIG. 7, FIG. 8 and FIG. 9 illustrate that the second row center seat 10 is completely moved in the right direction thereof. In the instant case, the interval between the second row center seat 10 and the second row side seat 20 is sufficiently increased and large.

When the second row center seat 10 is completely moved in the right direction, the lower end portion of the locking lever 130 is positioned at a right end portion of the guide groove 170. In the instant state, when the user releases the release lever 300, the locking lever 130 returns to an initial position by being rotated in a reverse direction (forward) by the restoring force of the lever spring 160. In the instant case, the lower end portion of the locking lever 130 is inserted into the right locking groove 142 (state D in FIG. 9).

When the lower end portion of the locking lever 130 is inserted and fixed into the right locking groove 142, the locked state of the locking lever 130 is maintained so that the second row center seat 10 is maintained in the fixed state in which the second row center seat 10 cannot moved in the state in which the second row center seat 10 is moved rightward.

The operation of returning the second row center seat 10, which has been moved rightward, by moving the second row center seat 10 to the left side at which the second row side seat 20 is present may be performed by performing the above-mentioned operation in the reverse order. Therefore, a description thereof will be omitted.

Figure 10:
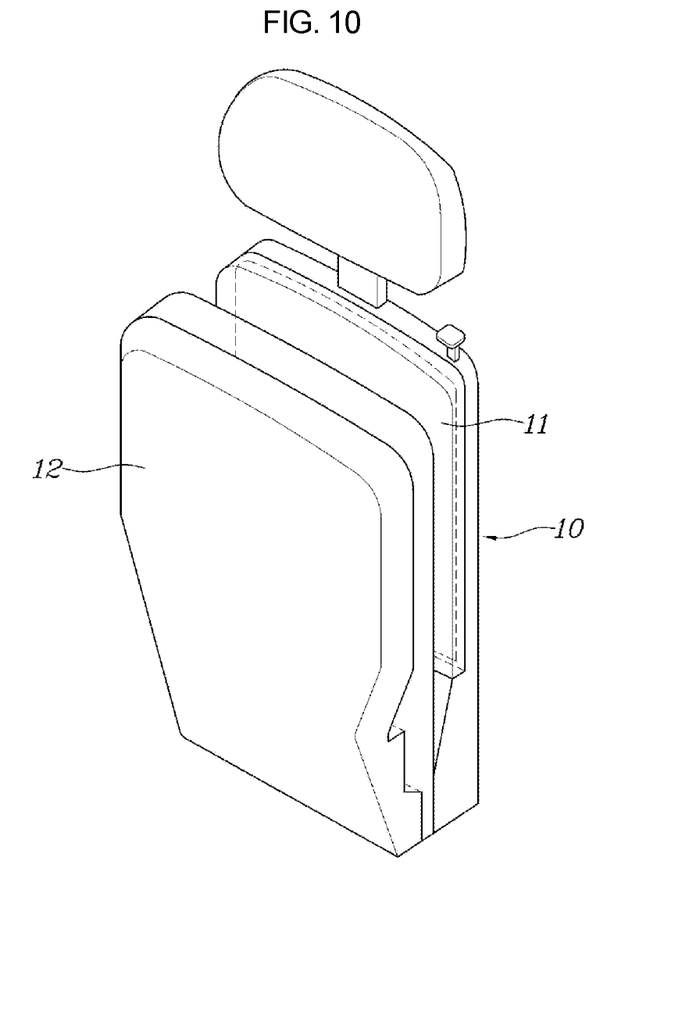
FIG. 10 is a view exemplarily illustrating a state in which a cushion portion of the second row center seat is tipped up to be in close contact with a back portion according to an exemplary embodiment of the present disclosure.

At the time of moving the second row center seat 10 in the leftward/rightward direction according to an exemplary embodiment of the present disclosure, the second row center seat 10 moves in the state in which the cushion portion 12 of the second row center seat 10 is tipped up to be in close contact with the back portion 11. Therefore, it is possible to maximally prevent interference with peripheral objects when the second row center seat 10 moves.

As described above, the seat for a vehicle according to an exemplary embodiment of the present disclosure includes the second row center seat 10 and the second row side seat 20 provided on the partition wall 2 positioned rearward of the driver seat 1, and the second row center seat 10 is structured to move leftward or rightward relative to the partition wall 2. When the second row center seat 10 moves in the right direction away from the second row side seat 20, the interval between the second row center seat 10 and the second row side seat 20 is increased and maintained. Therefore, it is possible to maximally prevent contact between the passenger accommodated in the second row center seat 10 and the passenger accommodated in the second row side seat 20, inducing a comfortable accommodated state of the passenger.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A seat for a vehicle, the seat comprising:
   a second row center seat and a second row side seat provided on a partition wall positioned rearward of a driver seat in the vehicle; and
   a locking device configured to selectively connect the partition wall and the second row center seat,
   wherein when the locking device is unlocked, the second row center seat is movable leftward or rightward of the vehicle so that an interval between the second row center seat and the second row side seat is adjusted,
   wherein the locking device includes:
      a lever bracket provided on a back portion of the second row center seat;
      a locking lever coupled to the lever bracket and configured to be rotatable forward or rearward about a lever pin connecting the locking lever and the lever bracket; and
      a locking plate fixedly provided on the partition wall to face the locking lever and including a locking groove into which a lower end portion of the locking lever is inserted.

2. The seat of claim 1, wherein the locking device further includes a lever spring coupled to the lever bracket and first and second opposite end portions of the locking lever and configured to provide a restoring force to the locking lever.

3. The seat of claim 1,
   wherein the locking groove includes a left locking groove and a right locking groove,
   wherein the locking plate includes a guide groove extending leftward and rightward, and
   wherein the left locking groove and the right locking groove are connected to first and second opposite end portions of the guide groove and protrude in a same direction thereof.

4. The seat of claim 3, wherein when the lower end portion of the locking lever is inserted into the left locking groove or the right locking groove, the second row center seat becomes in a fixed state in which the second row center seat cannot move leftward and rightward.

5. The seat of claim 3, wherein when the lower end portion of the locking lever is separated from the left locking groove or the right locking groove and positioned in the guide groove, the locking lever is configured for moving along the guide groove, and the second row center seat is configured for moving leftward or rightward.

6. The seat of claim 3, wherein when the lower end portion of the locking lever is inserted into the left locking groove, the second row center seat moves to the second row side seat and becomes in a fixed state so that the interval between the second row center seat and the second row side seat is maintained to be a first interval.

7. The seat of claim 3, wherein when the lower end portion of the locking lever is inserted into the right locking groove, the second row center seat moves laterally away from the second row side seat and becomes in a fixed state so that the interval between the second row center seat and the second row side seat is maintained to be a second interval.

8. The seat of claim 3, further including:
   a lever cable connected to the locking lever; and
   a release lever connected to the lever cable, provided on the back portion of the second row center seat, and configured to be manipulated by a user.

9. The seat of claim 8,
   wherein when the lever cable is pulled in response that the user manipulates the release lever in a state in which the lower end portion of the locking lever is inserted into the left locking groove or the right locking groove, the lower end portion of the locking lever is separated from the left locking groove or the right locking groove and positioned in the guide groove by a rotation of the locking lever,
   wherein when the lower end portion of the locking lever is positioned in the guide groove, the locking lever is unlocked, and
   wherein when the locking lever is unlocked, the second row center seat is configured for moving leftward or rightward.

10. The seat of claim 1,
wherein a partition wall mounting bracket is fixed to the partition wall,
wherein a guide rod is fixed to the partition wall mounting bracket and extends leftward and rightward,
wherein a slide bracket is fixed to a back portion of the second row center seat,
wherein the guide rod is provided to penetrate the slide bracket, and
wherein the second row center seat moves leftward or rightward when the slide bracket moves along the guide rod.

11. The seat of claim 1, wherein the second row center seat includes:
the back portion connected to the partition wall; and
a cushion portion rotatably coupled to the back portion, and
wherein the second row center seat moves leftward or rightward in a state in which the cushion portion is tipped up to be in contact with the back portion.

12. A seat for a vehicle, the seat comprising:
a second row center seat and a second row side seat provided on a partition wall positioned rearward of a driver seat in the vehicle; and
a locking device configured to selectively connect the partition wall and the second row center seat,
wherein when the locking device is unlocked, the second row center seat is movable leftward or rightward of the vehicle so that an interval between the second row center seat and the second row side seat is adjusted,
wherein a partition wall mounting bracket is fixed to the partition wall,
wherein a guide rod is fixed to the partition wall mounting bracket and extends leftward and rightward,
wherein a slide bracket is fixed to a back portion of the second row center seat,
wherein the guide rod is provided to penetrate the slide bracket, and
wherein the second row center seat moves leftward or rightward when the slide bracket moves along the guide rod.

* * * * *